US011364478B2

(12) United States Patent
Gardell

(10) Patent No.: US 11,364,478 B2
(45) Date of Patent: Jun. 21, 2022

(54) METHOD OF MANUFACTURING THROWABLE PAINTBALLS AND PAINTBALLS MADE THEREFROM

(71) Applicant: Mezzimatic LLC, Bethlehem, PA (US)

(72) Inventor: Briana Gardell, Bethlehem, PA (US)

(73) Assignee: Mezzimatic, LLC, Bethlehem, PA (US)

( * ) Notice: Subject to any disclaimer, the term of this patent is extended or adjusted under 35 U.S.C. 154(b) by 0 days.

(21) Appl. No.: 16/874,988

(22) Filed: May 15, 2020

(65) Prior Publication Data

US 2021/0254953 A1 Aug. 19, 2021

Related U.S. Application Data

(60) Provisional application No. 62/851,119, filed on May 22, 2019.

(51) Int. Cl.
| | |
|---|---|
| *B01J 13/02* | (2006.01) |
| *F42B 12/40* | (2006.01) |
| *C09D 177/00* | (2006.01) |
| *C08K 3/105* | (2018.01) |
| *B01J 13/04* | (2006.01) |
| *A61K 9/48* | (2006.01) |
| *C09D 105/04* | (2006.01) |
| *A63B 37/08* | (2006.01) |

(52) U.S. Cl.
CPC ............. *B01J 13/02* (2013.01); *A61K 9/4816* (2013.01); *A61K 9/4825* (2013.01); *A61K 9/4833* (2013.01); *B01J 13/046* (2013.01); *C08K 3/105* (2018.01); *C09D 105/04* (2013.01); *C09D 177/00* (2013.01); *F42B 12/40* (2013.01); *A63B 37/08* (2013.01); *A63B 2037/085* (2013.01)

(58) Field of Classification Search
CPC .... F42B 8/14; F42B 8/16; F42B 12/40; A63B 37/08; A63B 37/085; A61K 9/4816; A61K 9/4825; A61K 9/4833; B01J 13/02; B01J 13/046; C08L 5/04; C09D 105/04
See application file for complete search history.

(56) References Cited

U.S. PATENT DOCUMENTS

| | | | | |
|---|---|---|---|---|
| 5,698,222 | A * | 12/1997 | Mazer | ............ A61K 33/06 424/439 |
| 2012/0301546 | A1* | 11/2012 | Hassan | ............ A61K 9/4825 424/465 |
| 2021/0121466 | A1* | 4/2021 | Frankel | ............ A61K 35/17 |

FOREIGN PATENT DOCUMENTS

| | | | | |
|---|---|---|---|---|
| CA | | 333007 A * | 6/1933 | |
| WO | WO-2004010973 A2 * | | 2/2004 | ............ A61P 21/00 |

\* cited by examiner

*Primary Examiner* — Kregg T Brooks
(74) *Attorney, Agent, or Firm* — Joseph E. Maenner; Maenner & Associates, LLC

(57) ABSTRACT

A method of encapsulating content with calcium alginate membrane to form a capsule. The method includes embedding sodium alginate into a traditional gelatin ribbon used in gelatin encapsulation, adding calcium to a fill material, encapsulating the fill material, and then denaturing the gelatin in the shell. An exemplary use of this method is to form throwable paintballs; however, other products could be formed using this process. A paintball formed by this process is also disclosed.

5 Claims, 3 Drawing Sheets

METHOD OF MANUFACTURING THROWABLE PAINTBALLS AND PAINTBALLS MADE THEREFROM

CROSS REFERENCE TO RELATED APPLICATION

The present application claims the benefit of U.S. Provisional patent application Ser. No. 62/851,119, filed on May 22, 2019, which is incorporated herein by reference in its entirety.

BACKGROUND OF THE INVENTION

Field of the Invention

The present invention relates to throwable paintballs and a method of manufacturing the same.

Description of the Related Art

The manufacturing process of encapsulating products in gelatin shells is long established. Gelatin capsules are popular to create pharmaceutical pills. Gelatin encapsulation is also how traditional paintballs are manufactured. The technique has been developed significantly since the basic technique was described in U.S. Pat. No. 2,234,479. The basic technique involves two gelatin ribbons sealed around fill material using two roller dies.

The shell of a gelatin capsule is composed of gelatin, one or more plasticizers, such as glycerin, and water. In addition, the shell may contain preservatives, coloring and opacifying agents. The fill material is limited to those that do not have an adverse impact on the gelatin walls. Most importantly, water-based liquids typically cannot be encapsulated utilizing gelatin encapsulation.

Spherification is traditionally a culinary process that utilizes the reaction between sodium alginate and calcium to create squishy spheres. The basic technique was described in U.S. Pat. No. 2,403,547. There are two types of spherification. Basic spherification involves the sodium alginate-based liquid dripped into a calcium-based bath. Reverse spherification involves a calcium-based liquid dripped into a sodium alginate bath. Reverse spherification forms a calcium alginate membrane around the calcium-based liquid. Unlike, gelatin encapsulation, reverse spherification has not been widely commercialized due to difficulties in forming uniform products and the necessity to store the spheres in liquid.

It would be beneficial to provide a reverse spherification process that yields uniform products and does not require the product to be stored in liquid, as well as to provide a way to use soft gel encapsulation to encapsulate a water-based fill.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention provides a method of encapsulating content with a calcium alginate membrane utilizing soft gel encapsulation manufacturing. The described invention calls for the sodium alginate to be embedded in the gelatin ribbons. The gelatin ribbon is then used in the traditional soft gel encapsulation process. A calcium salt is either included in the fill material or the capsule is placed in a calcium salt bath after encapsulation. A calcium alginate membrane forms from the presence of both a calcium salt and sodium alginate. Then the gelatin in the shell structure is denatured with enzymes, such as bromelain, or heat and the calcium alginate membrane remains, thus forming calcium alginate spheres utilizing gelatin encapsulation machines.

To utilize reverse spherification, one must drip or squirt calcium-based liquid into a sodium alginate and water bath. The two liquids react, and a membrane of calcium alginate encapsulates the liquid that was squirted into the sodium alginate bath, forming squishy spheres. The concentration of the sodium alginate and calcium and the time spent in the bath determines membrane thickness. On a large manufacturing scale, this process causes many issues. The concentration of sodium alginate in the sodium alginate bath reduces over time; therefore, one must either utilize the sodium alginate bath once, attempt to replenish the alginate or accept inconsistent membrane thickness. If the spheres are not washed uniformly and in the same time frame, the membrane thickness of each sphere will also differ. The spheres also will stick together in the alginate bath if not rinsed thoroughly, which also creates a lot of waste and the rinsing process requires a lot of water. Therefore, currently, one must either accept or manage inconsistencies or increase waste during the manufacturing process. When the spheres are used as paintballs the thickness of the membrane is particularly important so that the paintballs break when thrown at desired targets but do not break during transportation.

The present invention prevents material waste during manufacturing and creates consistent membrane thickness. Embedding the sodium alginate in the gelatin ribbon allows one to regulate the exact amount of sodium alginate per sphere. The amount of sodium alginate and calcium directly corresponds with the membrane thickness. Additionally, this method prevents the need for an alginate bath or a rinsing bath which saves a significant amount of water during the manufacturing process.

Using soft gel encapsulation also helps maintain the shape of the paintball. The shape of the paintballs in the reverse spherification process is usually influenced by the viscosity and weight of the calcium liquid and the viscosity of the sodium alginate solution often leading to misshaped spheres or spheres with tails. Misshaped product creates waste during the manufacturing process.

The gelatin shell also adds fortification of the calcium alginate membrane that forms until the gelatin is denatured. This allows for the paintballs to be stronger during the manufacturing process and/or during transportation, but then can be weaken when ready to use.

The present invention allows soft gel encapsulation to encapsulate a water-based fill. Previously, only non-water-based fills could be used during soft gel encapsulation, such as polyethylene glycol or fish oil.

A calcium alginate membrane would normally require the spheres to be stored in a liquid to prevent dehydration of the spheres. The present invention also allows a calcium alginate membrane to be utilized without needing to store the product in liquid.

In one embodiment, the present invention provides a method of encapsulating content with calcium alginate membrane. The method includes embedding sodium alginate into a traditional gelatin ribbon used in gelatin encapsulation, adding calcium to the fill material, or placing the capsules in a calcium bath after encapsulation. The spheres can then be softened like traditional reverse spherification spheres by denaturing the gelatin with heat or enzymes. An exemplary use of this method is to form throwable paintballs; however, other products could be formed using this process.

In an alternative embodiment, the present invention provides a paintball manufactured by the method as described above.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
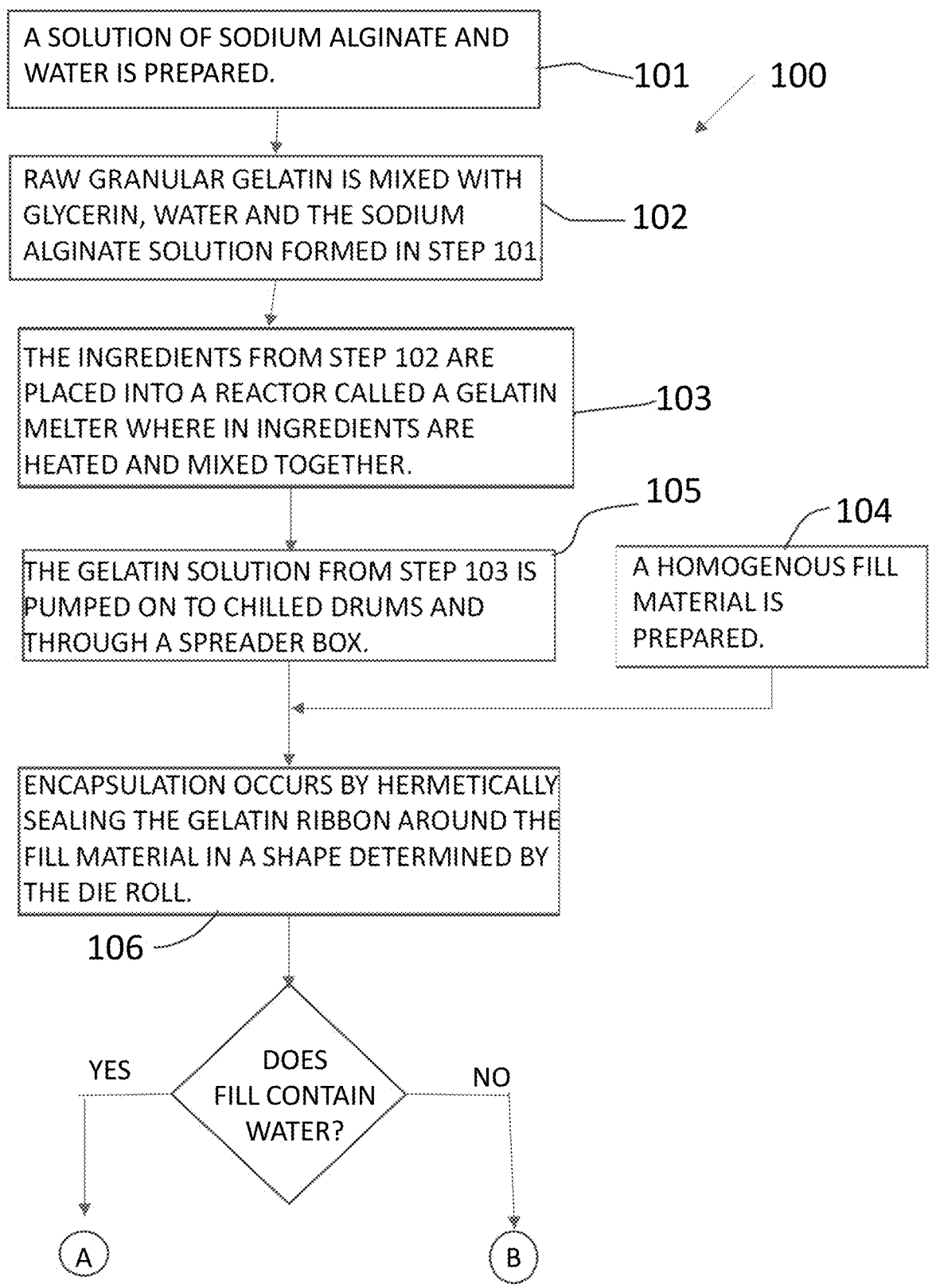
FIG. 1 is a flowchart illustrating an exemplary method of manufacturing paintballs according to the present invention.
Figure 1A:
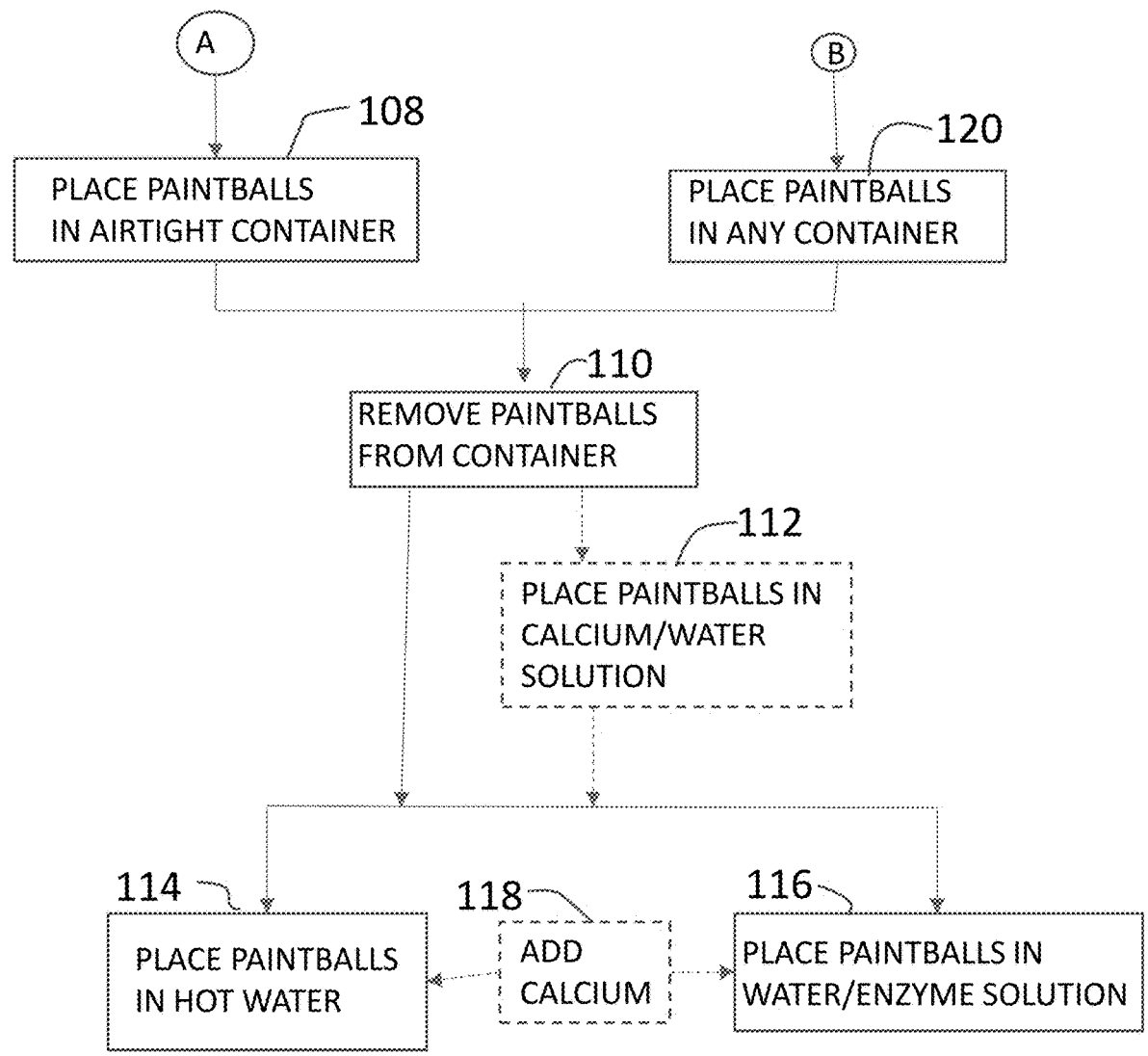
FIG. 1A is a continuation of the flowchart of FIG. 1.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "X" is a multiplier and can be any positive number.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a method of encapsulating content with a calcium alginate membrane utilizing soft gel encapsulation. The described invention calls for the sodium alginate to be embedded in the gelatin ribbons. The gelatin ribbon is then used in the traditional encapsulation process. The gelatin in the shell can be removed by denaturing the gelatin with enzymes or water and heat. If the gelatin is removed, the calcium alginate membrane still holds the contents of the shell.

An exemplary method of manufacturing the paintballs of the present invention is described below with reference to flow chart 100 of FIG. 1.

In step 101, a solution of sodium alginate and water is prepared. An exemplary solution includes 1.16% sodium alginate solution per weight mixed with distilled water. In step 102, raw granular gelatin is mixed with glycerin, water and the sodium alginate solution formed in step 101. While animal-based gelatin is desired, vegan equivalents to animal-based gelatin can also be used. As used herein, both animal-based gelatin and vegan equivalents to gelatin are described together as "gelatin".

In an exemplary embodiment, 111 (or "111X") grams of gelatin, 47 (or "47X") grams of glycerin, and 130 (or "130X") grams of water and sodium alginate solution as described in step 101 is mixed together. Preservatives, coloring and opacifying agents can be added.

In step 103, the ingredients from step 102 are placed into a reactor called a gelatin melter. The reactor is surrounded by a thermal jacket and heats the mixture while a very high torque tribune mixer stirs the mixture under vacuum. This process takes around 3 hours until the gelatin turns into a molten liquid mass. Those skilled in the art will recognize that the time and temperature may vary.

In step 104, a fill material 213 (shown in FIG. 2) is prepared. The fill material depends on the capsules' application; however, the fill material must be a liquid or a paste. In order for the calcium alginate membrane to form, the fill material needs to contain calcium, or the paintball needs to be placed in a calcium bath at any point after encapsulation. In order to add calcium, a calcium salt, such as calcium chloride or calcium lactate, can be added to liquids. In an exemplary embodiment, 1.18 (or "1.18X") grams of calcium chloride, 10 (or "10X") grams of polyethylene glycol 3350, and 12 (or "12X") grams of water are mixed together to form the fill material. While step 104 can include adding calcium, if calcium is not added in step 104, calcium can be added during any of steps 112 or 118, as described in detail below. It is, however, imperative that calcium is added during the manufacturing process.

In step 105, the gelatin solution from step 103 is pumped onto chilled drums and through a spreader box. This transforms the liquid gelatin into two solid ribbons of gel.

In step 106, encapsulation occurs. Encapsulation is a manufacturing process that hermetically seals the gelatin ribbon around the fill material in a shape determined by a die roll.

Figure 2:
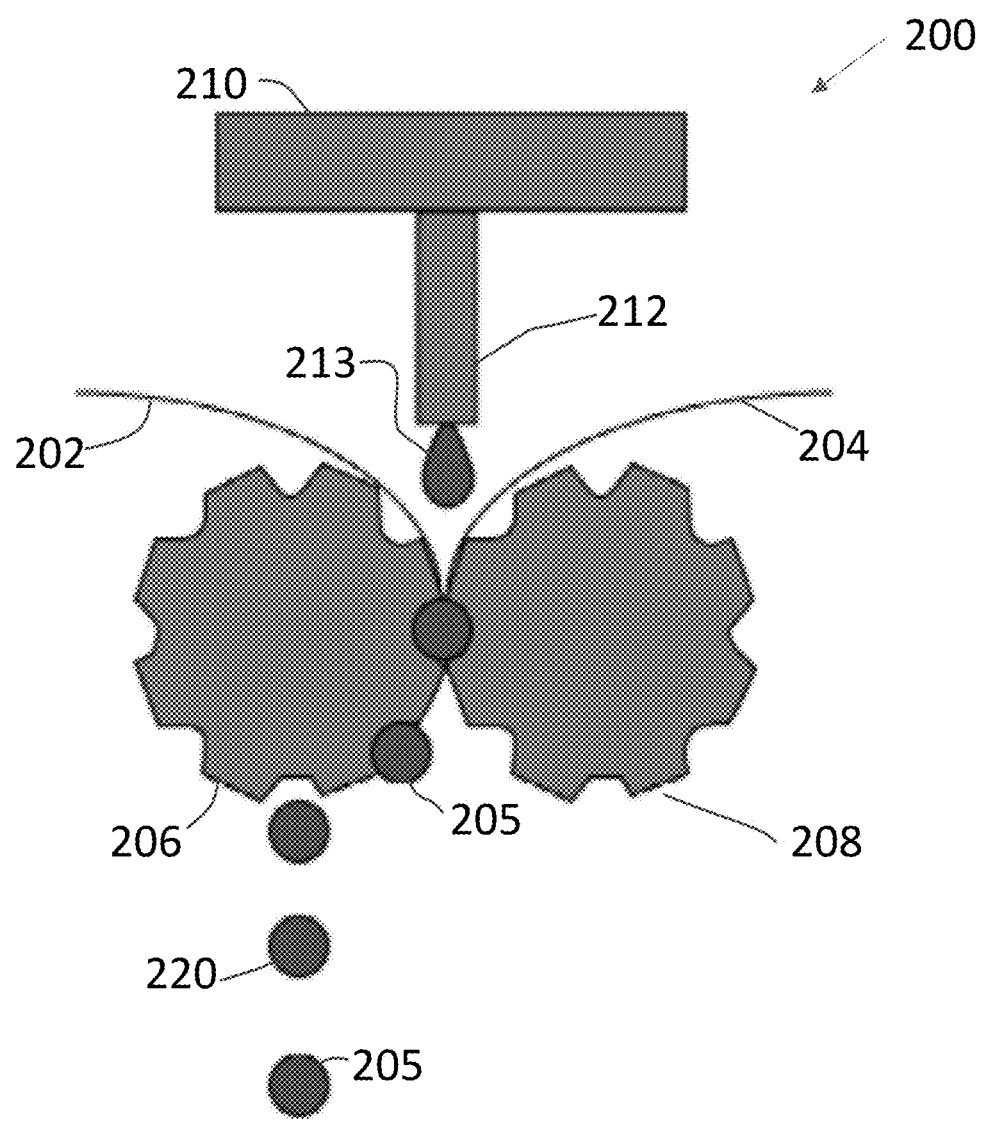
FIG. 2 is a side elevational view of an exemplary method of filling paintballs according to an exemplary embodiment of the present invention.

For the encapsulation process, referring to FIG. 2, two gel ribbons 202, 204, formed by the process of steps 101-105, are fed into two rotary dies 206, 208, respectively. Simultaneously, a displacement pump 210 delivers the fill material 213 into a heated wedge 212 that sits between two rotary dies 206, 208. The wedge 212 injects the fill material 213 formed in step 104 into the die cavities between ribbons 202, 204 just before the dies 206, 208 cut the ribbons 202, 204 and seal the two cut portions of ribbons 202, 204 together, forming a shell 205, with the fill material 213 in between, forming paintballs 220.

Fill material 213 can contain water or not contain water. If fill material 213 contains water, in step 108, paintballs 220 are stored in an airtight container (not shown) to prevent paintballs 220 from drying out. Prior to using paintballs 220, paintballs are removed from the container. Optionally, if calcium was not added in step 104, in step 112, paintballs 220 can be placed in a calcium and water solution. In an exemplary embodiment the water and calcium solution can include about X grams of calcium chloride and about 100X grams of water.

Regardless of whether step 112 is used, in step 114, the gelatin in the paintball 220 can optionally be denatured by placing the paintball 220 in hot water (about 102° F. or higher, depending on the type of gelatin used) or, alternatively, in step 116, paintball 220 can be placed in a water and enzyme solution that denatures gelatin. An exemplary enzyme can be bromelain. In an exemplary embodiment, the water and enzyme solution can include about X grams of bromelain and about 100X grams of water. If calcium has not yet been added in either of steps 104 or 112, in step 118, calcium can be added to the hot water of step 114 or to the water/enzyme solution of step 116. Denaturing the gelatin in the shell 205 reduces shell 205 to a calcium alginate membrane, making the shell 205 softer and more breakable.

If the paintballs 220 fill does not contain water, it can be beneficial to allow the paintball shell 205 to fully dry before storing, which is typically done in the traditional soft gel encapsulation process. In step 120, paintballs 220 can be stored in any type of container, whether or not the container is airtight.

The process then moves to steps 110,118, which are described above.

While exemplary percentages of ingredients are provided herein, those skilled in the art will recognize that other percentages can be used.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method of manufacturing a capsule comprising the steps of:
    (a) preparing a solution of sodium alginate and water;
    (b) mixing gelatin and a plasticizer with the sodium alginate and water solution formed in step (a), forming a mixture;
    (c) heating the mixture formed in step (b);
    (d) cooling the mixture formed in step (c);
    (e) forming a first part of the mixture into a first solid ribbon and a second part of the mixture into a second ribbon;
    (f) encapsulating a fill material between the first solid ribbon and the second solid ribbon, forming a capsule with a shell;
    (g) separating the capsule from the first solid ribbon and the second solid ribbon; and
    (h) denaturing the gelatin of the capsule by placing the capsule in a water/enzyme solution, wherein the solution comprises providing X grams of bromelain and 100X grams of water.

2. The method according to claim 1, wherein step (h) comprises the step of placing the capsule in water having a temperature of at least about 102 degrees Fahrenheit.

3. The method according to claim 1, further comprising, adding calcium during step (h).

4. The method according to claim 1, further comprising, prior to step (d), adding preservatives, coloring, or opacifying agents to the mixture or the solution.

5. A method of manufacturing a capsule comprising the steps of:
    (a) preparing a solution of sodium alginate and water;
    (b) mixing gelatin and a plasticizer with the sodium alginate and water solution formed in step (a), forming a mixture;
    (c) heating the mixture formed in step (b);
    (d) cooling the mixture formed in step (c);
    (e) forming a first part of the mixture into a first solid ribbon and a second part of the mixture into a second ribbon;
    (f) encapsulating a fill material between the first solid ribbon and the second solid ribbon, forming a capsule with a shell;
    (g) separating the capsule from the first solid ribbon and the second solid ribbon, and
    prior to step (f), the step of:
        forming the fill material, wherein the fill material comprises a liquid or a paste, wherein the step of forming the fill material comprises including 1.18X grams of calcium chloride, 10X grams of polyethylene glycol, and 12X grams of water mixed together as the fill material.

\* \* \* \* \*